Figure 13:
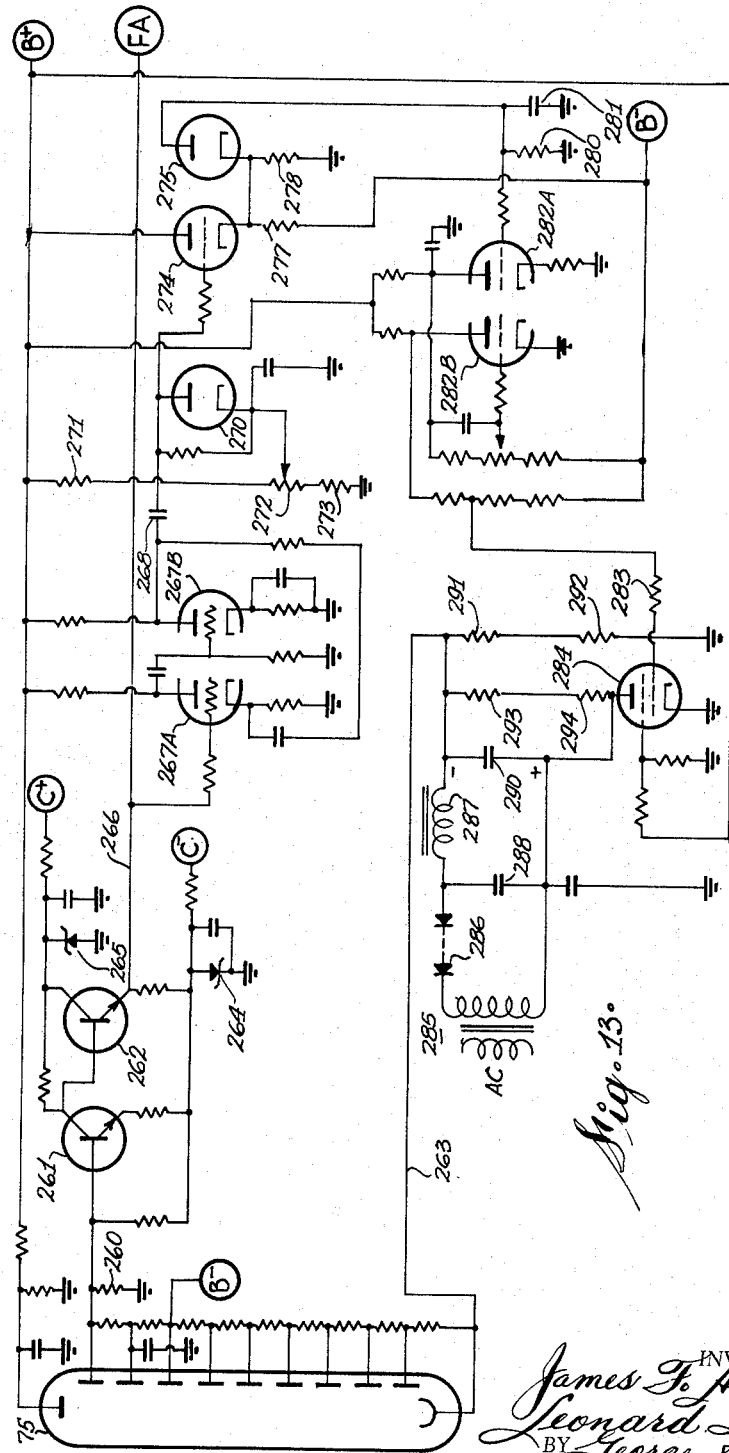

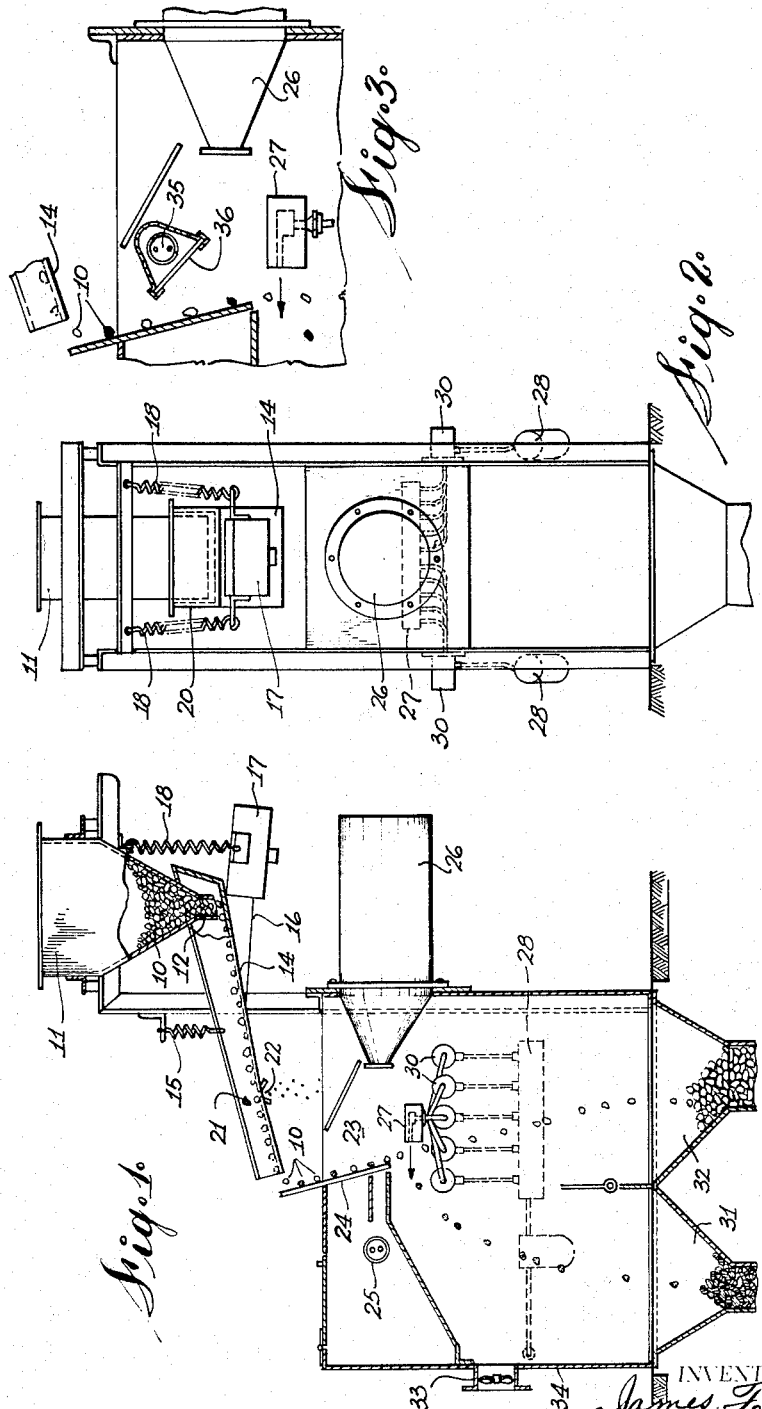

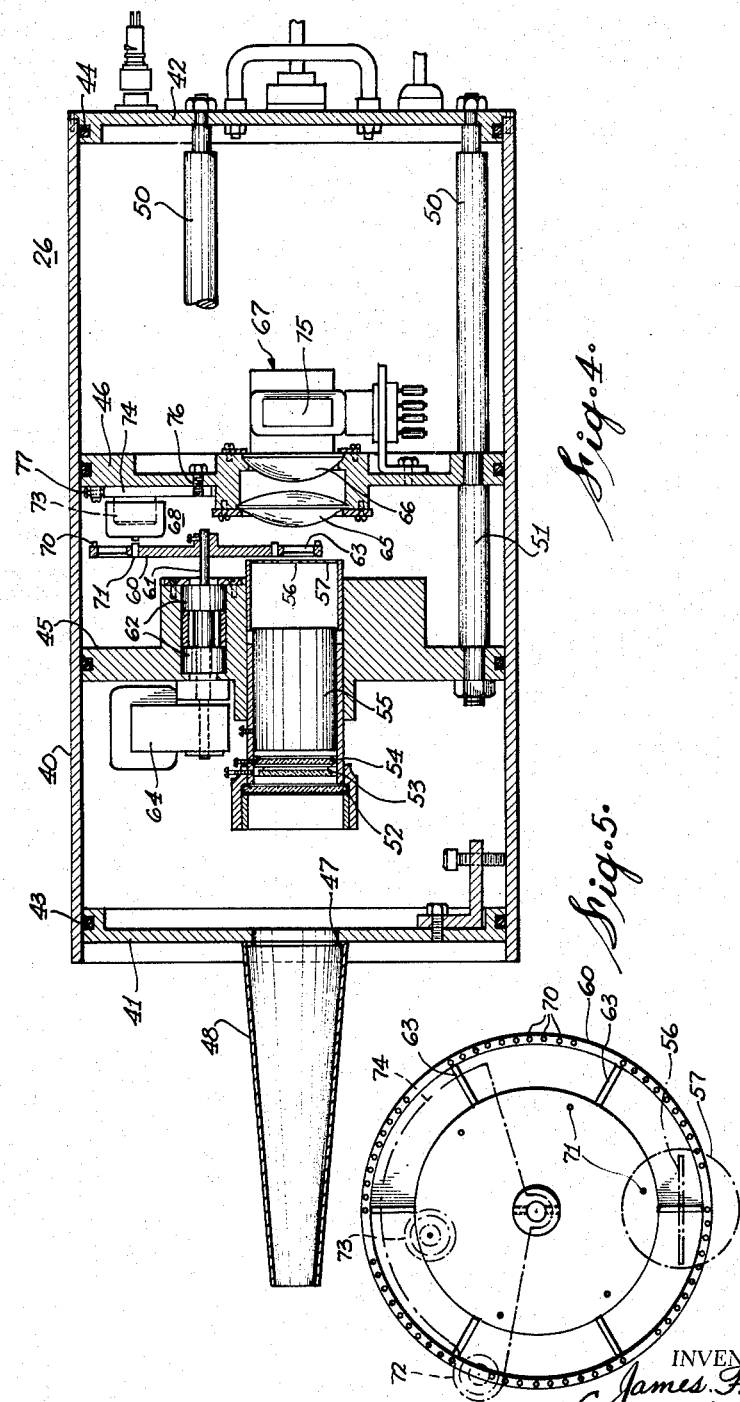

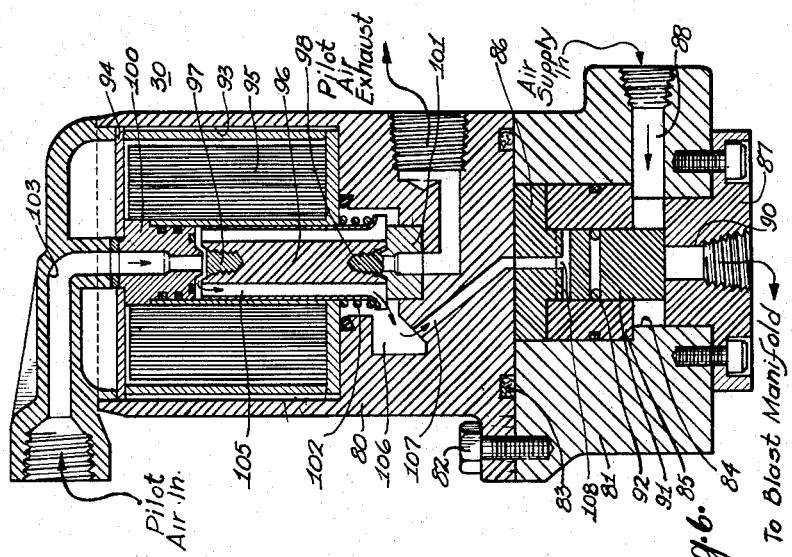
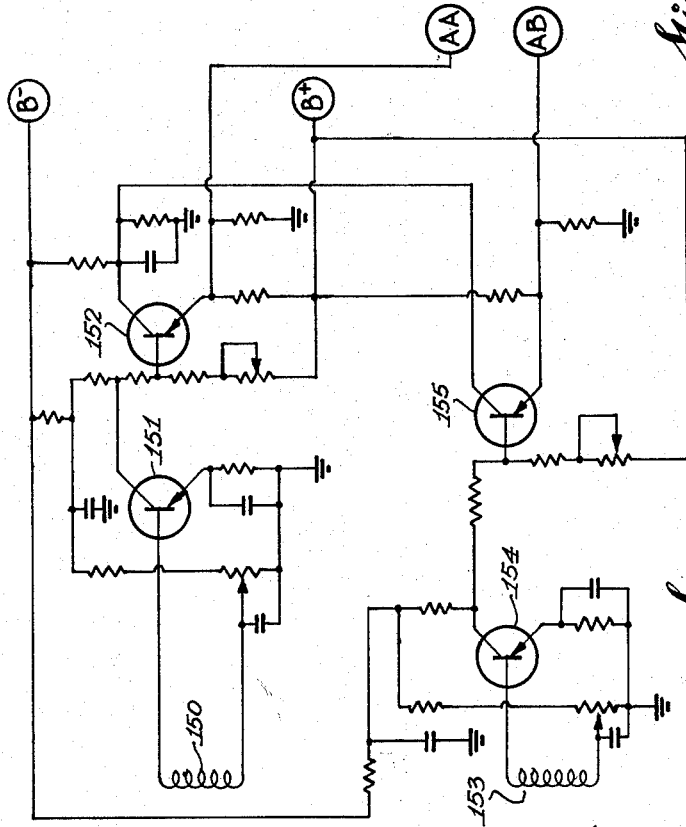

April 20, 1965 J. F. HUTTER ETAL 3,179,247
RANDOM STREAM MATERIALS SORTER
Filed June 28, 1962 10 Sheets-Sheet 4
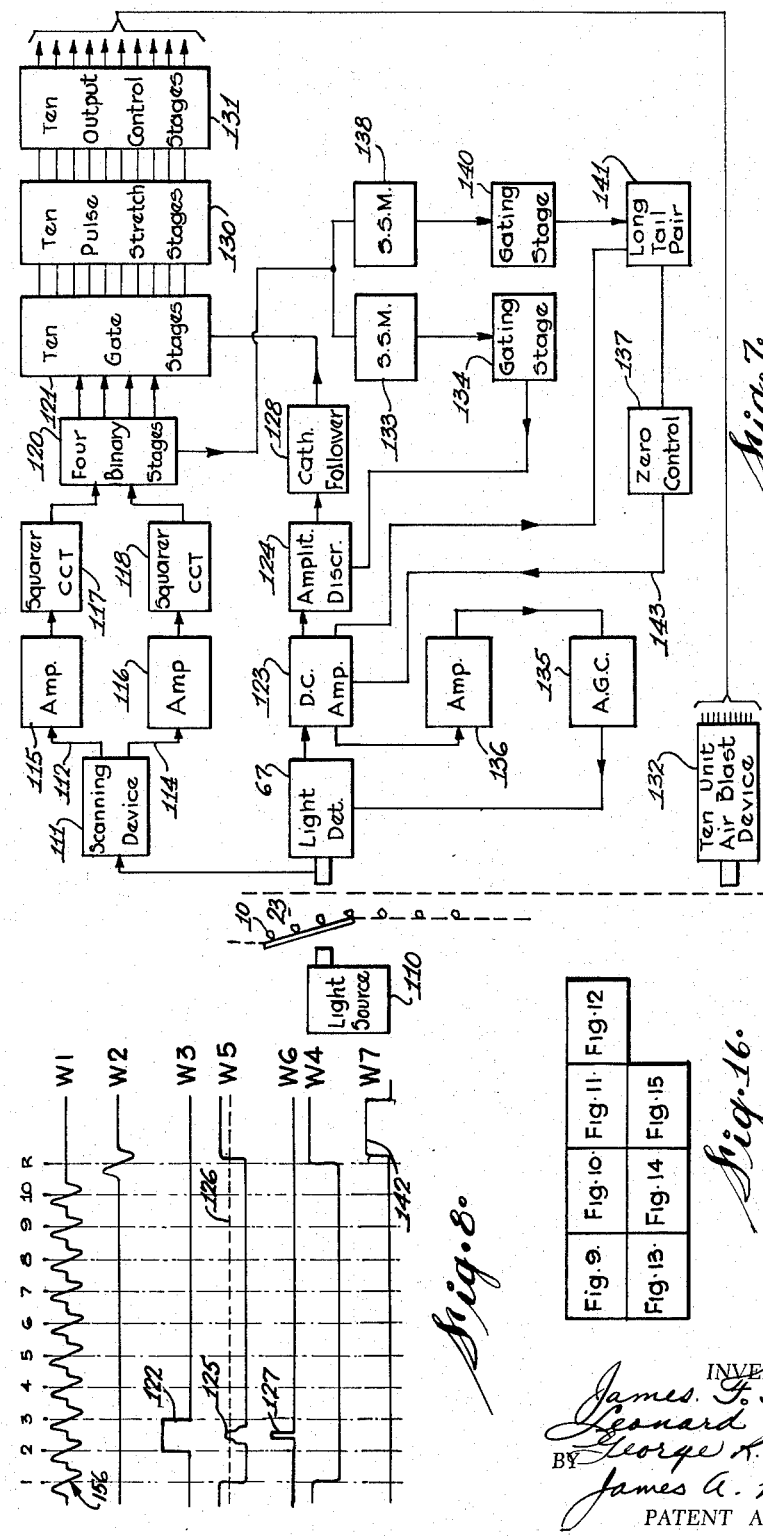
INVENTOR
James F. Hutter
Leonard Kelly
BY George L. Mounce
James A. Lamb
PATENT AGENT

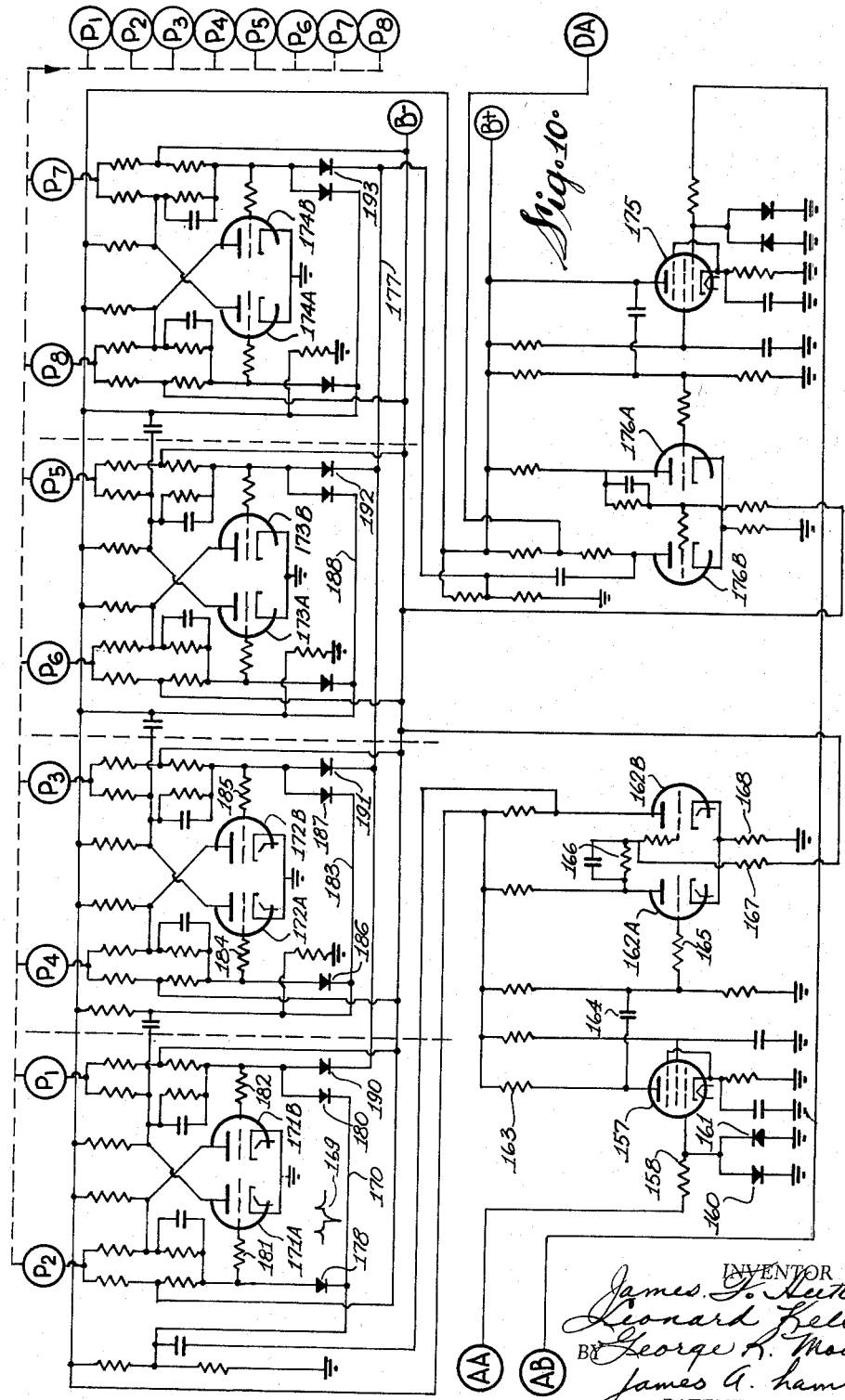

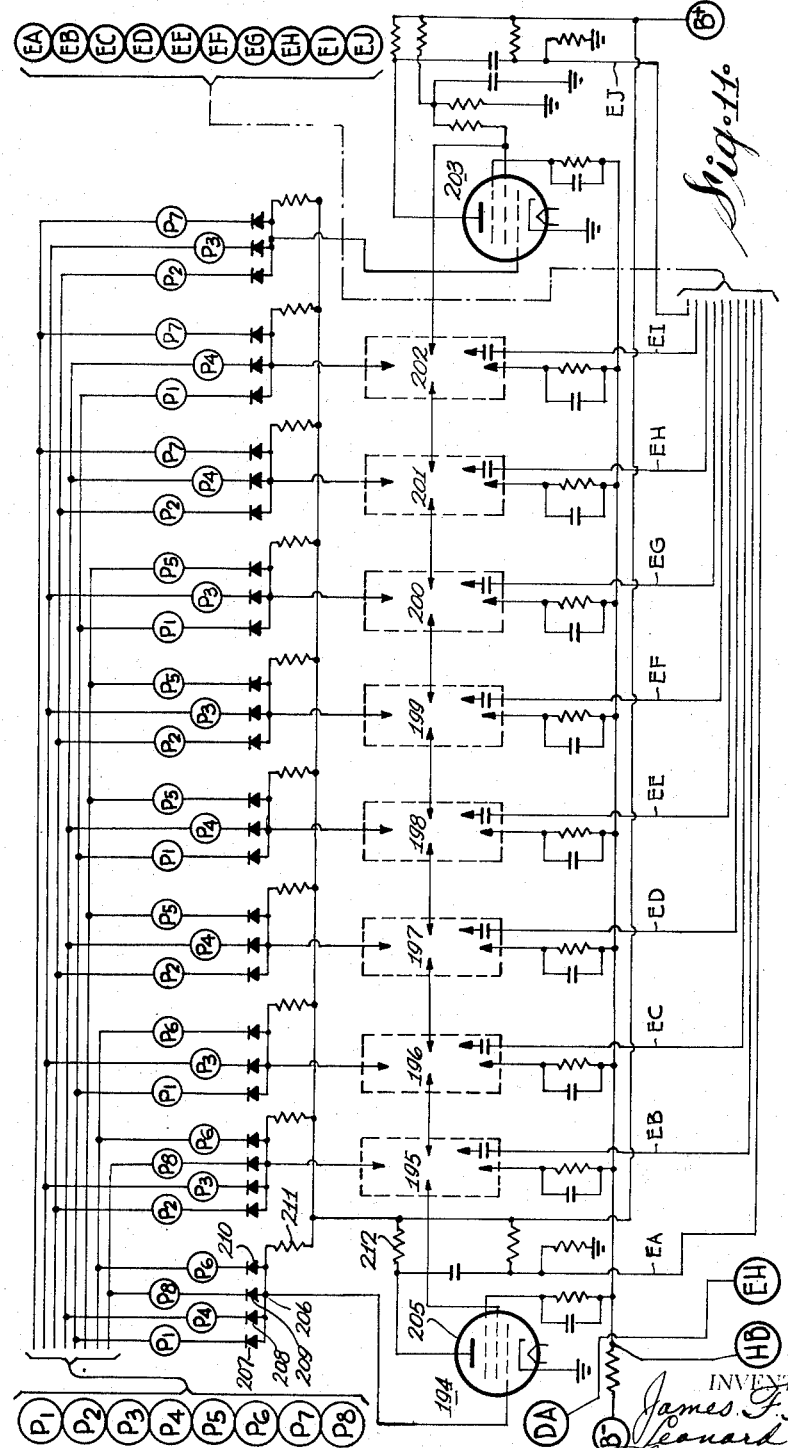

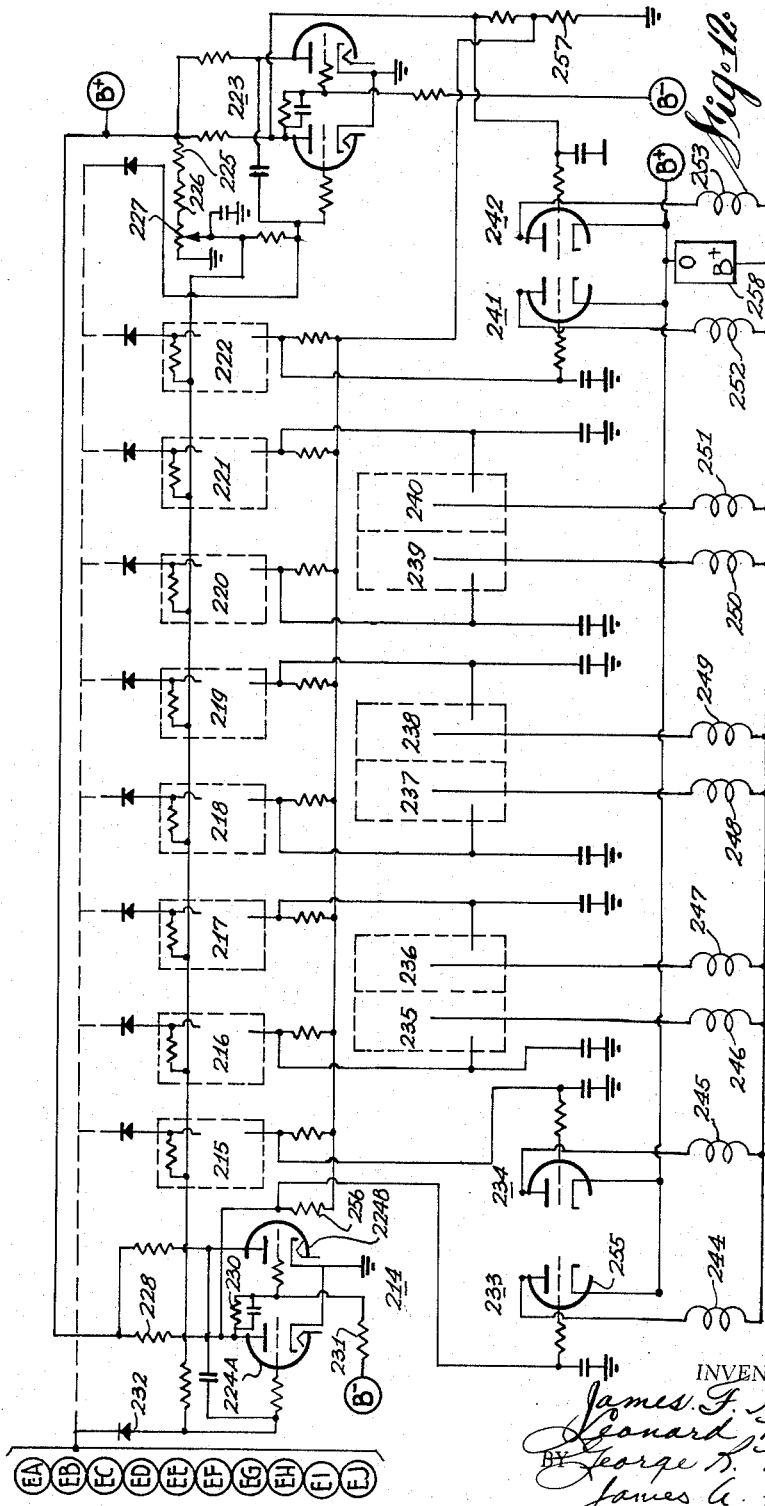

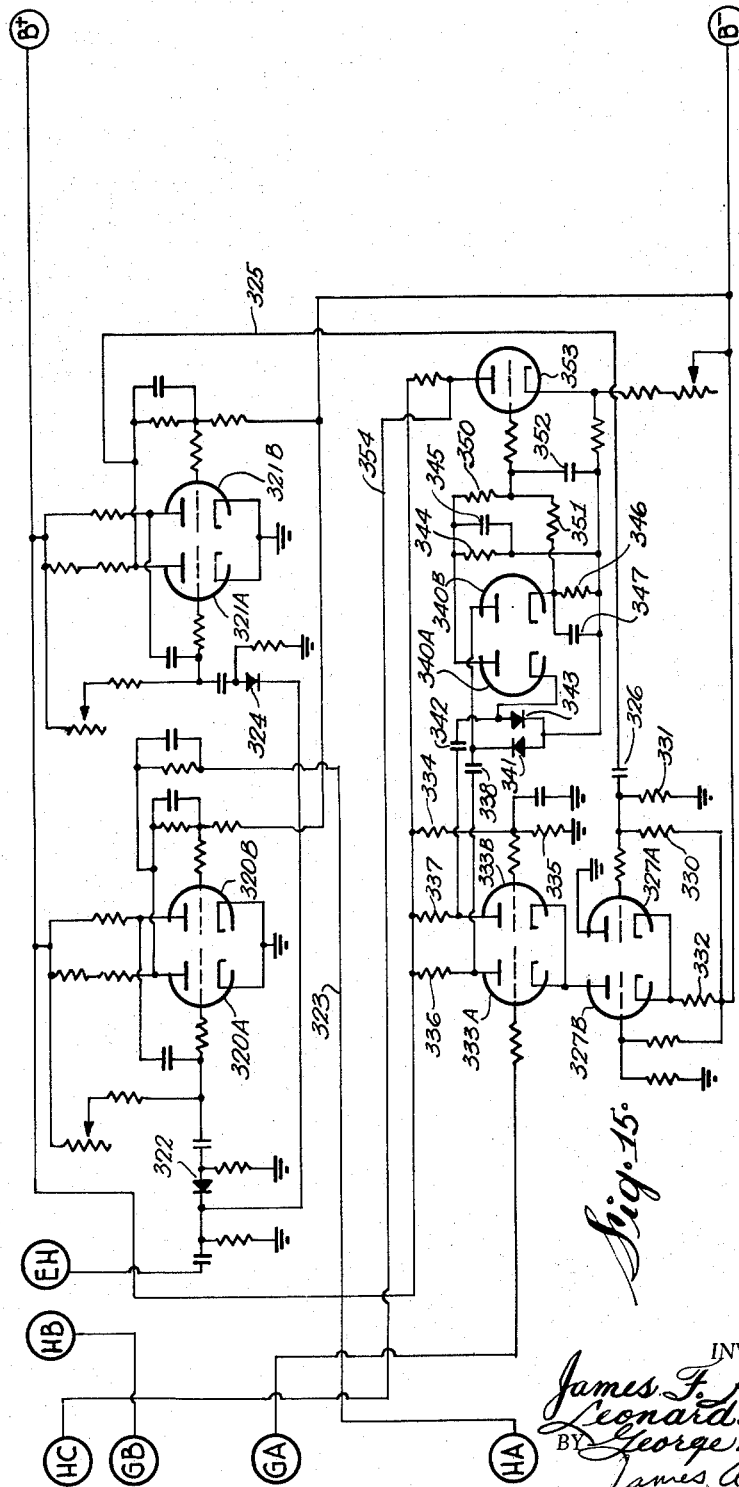

United States Patent Office 3,179,247
Patented Apr. 20, 1965

3,179,247
RANDOM STREAM MATERIALS SORTER
James F. Hutter and Leonard Kelly, Bancroft, Ontario, and George R. Mounce, Toronto, Ontario, Canada, assignors, by mesne assignments, to Sphere Investments Limited, Nassau, Bahama Islands, a corporation of the Bahama Islands
Filed June 28, 1962, Ser. No. 206,095
4 Claims. (Cl. 209—74)

This invention relates to an apparatus for automatically sorting a random stream of bodies of material moving along a wide path.

The expression "random stream of bodies of material" as it is used herein is intended to mean a plurality of articles, objects, units or fragments moving in a given direction and having a haphazard alignment and spacing. The term "wide path" as it is used herein is intended to mean a path of travel having sufficient width to accommodate a plurality of bodies of material moving along the path in side by side relationship, that is, it is intended to distinguish from a path where bodies travel in single row alignment.

Various types of sorters are known for sorting bodies of material automatically as the bodies move through the sorter in single row alignment. In these sorters the articles pass through a sorting zone in a line where they are individually inspected for some sorting characteristic and then individually sorted in accordance with the characteristic. One disadvantage of these prior sorters is the necessity for arranging the bodies to be sorted in a single row alignment. It is often difficult to achieve a satisfactory single row alignment, particularly with irregularly shaped bodies of different sizes. Another disadvantage of these prior sorters is that they are not able to process a large quantity of material in a short time because each article or body must pass successively through the sorting zone and be individually inspected. Thus, the sorting capacity of these prior sorters is relatively low.

It is known to arrange a plurality of these prior sorters in parallel to increase the sorting capacity of a particular installation. In other words, a battery of sorters are arranged with the individual sorting machines adjacent one another and with a feed of the bodies to be sorted going to each machine. While this arrangement increases the total sorting capacity, the original cost of the apparatus for the sorting installation becomes very high and the maintenance costs for a large number of sorting machines is excessive. As a result the overall cost of such an installation is prohibitive.

In the mining industry in particular there is a need for efficient automatic sorting of ore fragments. In the past, and at the present time in some countries where labour costs are low, much of the mined ore was hand sorted before refining. It is very desirable to remove worthless fragments or gangue before refining to keep the refining cost down. As labour costs increased, mechanical sorting became more attractive. However the use of prior art low capacity sorters did not prove economically feasible except in isolated instances. In spite of the need for a high speed, high capacity, automatic sorting machine, a need which has existed for some time, none are believed to have been available up to this time.

The present invention has particular application in the field of mining generally and will be discussed in this connection throughout the description. The present invention is especially well suited for sorting bodies of material according to their light affecting properties such as light transmitting or light reflecting properties. Subsequently, a preferred embodiment is described for sorting salt according to its translucency. It is not the intention to limit the invention to the automatic sorting of ore, nor is it the intention to limit the invention to sorting according to the light affecting properties of the material to be sorted. The invention is intended to be applied generally to the sorting of bodies of material moving in a wide path random stream where the bodies have an individually varying, remotely detectable, physical property.

The invention may be said to reside generally in an apparatus for sorting irregularly shaped bodies of material each having an individual value of a remotely detectable physical property. The invention includes a feed hopper arranged to receive a mass of the bodies to be sorted and having a bottom outlet for the bodies. Means defining a sorting zone is located below the hopper, such means having a generally vertical unobstructed path extending therethrough. There is provided a feed device having a smooth, unobstructed body receiving and conducting surface, such surface having a portion spaced from and directly underlying the entire area of the hopper outlet to receive the bodies in random fall from the outlet, such surface extending laterally beyond the portion under the outlet and having an unobstructed discharge edge located substantially directly above the path for random discharge of the bodies into the path. The path and the feed device surface constitute an unobstructed wide passage for a random stream of the bodies. Detector means is positioned laterally of and scanning the entire width of the passage to provide a signal indicative of the value of the physical property of each body in the passage related to the position and extent of the transversely extending portion of the passage over which the body moves. A row of rejection devices is positioned laterally of the path and lies opposite the entire width of the path, such rejection devices abutting one another to provide a substantially continuous rejection means from one end to the other of the row. Each rejection device is normally inoperative to permit unrestricted passage of the bodies therepast and has an operative body-directing condition. There is provided means responsive to one of the signals of a pre-determined value related to the transversely extending portion of the path over which each body moves, arranged to actuate to an operative condition the number of rejection devices lying opposite the transversely extending portion of the path.

An embodiment of this invention may be used for sorting rock salt. Rock salt beds normally consist of a crystalline halite, which is quite translucent to visible and infra-red radiation, and impurities such as anhydrite, which are opaque. The anhydrite imparts a dirty appearance to the rock salt as well as lowering the chemical purity of the product. The removal of the opaque anhydrite is desirable. In a preferred embodiment of the invention used for sorting rock salt, a feeder feeds a wide path random stream of salt through a sorting zone so that each piece or body of salt material maintains a substantially constant random distance from an edge of the stream while passing through the sorting zone. The stream of bodies passes between a light source and a detector means positioned adjacent the sorting zone. The detector means provides a signal indicative of the translucency or opaqueness of each body related to one of a predetermined number of adjacent portions of the stream in the sorting zone. A rejection means is located in the sorting zone for each said portion of the stream. The rejection means has a first condition where bodies are directed to a first path and a second condition where bodies are directed to a second path. Means are provided which actuate the respective rejection means according to the detector signal for bodies in each portion of the stream.

It will be seen that this invention seeks to overcome the disadvantages of prior apparatus by providing a high capacity sorting means. The sorter receives and sorts bodies of material in a wide path random stream. This greatly increases the capacity of the sorter and does away with the necessity of using equipment to align the bodies before sorting.

Accordingly, it is an object of the invention to provide an improved sorting apparatus of novel design, capable of a high rate of sorting.

It is another object of this invention to provide an apparatus for sorting a wide path random stream of bodies of material in accordance with a remotely detectable physical property of the bodies.

It is another object of this invention to provide means for sorting a wide path random stream of bodies of material according to their translucency.

It is also an object of this invention to provide equipment for directing individual bodies of material towards either of two alternative destinations as the bodies move through the equipment in a wide path random stream under the influence of gravity.

Further objects and advantages of the invention will appear from the following description taken in conjunction with the accompanying drawings in which FIGURE 1 is a side view, partly in section, of an embodiment of the invention suitable for sorting bodies of material moving in a wide path random stream, FIGURE 2 is an end view of the apparatus of FIGURE 1, FIGURE 3 is a side view, partly in section, of a portion of the sorting zone of another embodiment of the invention, FIGURE 4 is a sectional view of a monitor apparatus used in the invention, FIGURE 5 is a representation of a scanning disc used in the monitor of FIGURE 4 with associated parts indicated in phantom, FIGURE 6 is a sectional side view of a control valve suitable for use in the apparatus according to the invention, FIGURE 7 is a simplified block diagram of the circuits and apparatus used in one embodiment of the invention, FIGURE 8 shows a series of waveforms that are useful in describing the operation of the circuits and apparatus of FIGURE 7, FIGURES 9 through 15 are schematic circuit diagrams of portions of the circuitry that may be used in various embodiments of the invention, and FIGURE 16 is a layout diagram showing the arrangement of the circuit diagrams of FIGURES 9 through 15.

Referring to FIGURES 1 and 2, there is shown a side and an end view of an apparatus according to one embodiment of this invention for sorting rock salt. The pieces or bodies of salt 10 to be sorted are held in a hopper 11 which has a bottom opening 12. The salt bodies 10 are moved downwards through opening 12 by gravity onto a vibrating table 14 suspended by springs 15. Additional supporting springs may, of course, be used when circumstances require it. A connecting member 16 joins table 14 to a vibrating motor 17. Springs 18 support the motor end of the vibrating table assembly. Such vibrating feeders are known in the art. The vibration of table 14 tends to distribute the bodies of salt over the table 14 and at the same time cause them to move down the sloping table surface in a stream. The table 14 has side walls 20 which define the edge of the stream.

The bodies of salt 10 move along the vibrating table 14 in a wide path random stream. The rate of feed onto the table is such that the stream is substantially no thicker than one unit, that is, each piece or body of salt moves along the stream in contact with the table 14.

It has been noted that a more evenly distributed stream is obtained by having a slight bend in the table 14 extending transversely across the table. The bend is indicated at 21 forming a slight crest or hump across the path of the salt stream. The bend 21 is, of course, not necessary for satisfactory operation of the vibrating table 14.

The stream of crystals or bodies of salt 10 may include undesirable very fine particles. These very fine particles tend to impair the efficiency of the subsequent sorting action and it is desirable to eliminate or substantially reduce the amount of these fine particles or dust before the sorting. One way of doing this that has been found to be satisfactory is to have a fine transverse slot 22 extending across the vibrating table 14. The slot 22 is narrow and does not impede the flow of bodies 10 in the salt stream. A convenient position for this slot 22 is at the bend in table 14, as shown.

The bodies of salt 10 move along the vibrating table to the lower end where they fall into the sorting zone 23. The bodies 10 move through the sorting zone under the influence of gravity, and as each body accelerates with respect to the following body, the spacing between individual bodies increases. Thus, the bodies enter the sorting zone in a wide path random stream and each body maintains substantially a constant random distance from an edge of the stream while passing through the sorting zone but the distance between adjacent bodies in the direction of stream flow tends to increase. This increased separation of the succeeding bodies is desirable to permit more selective rejection of undesired bodies.

While the bodies 10 may pass through the sorting zone 23 in free fall, it may be desirable to guide or direct them. For example, as the bodies 10 leave the end of vibrating table 14 and begin free fall they tend to fan out slightly, that is, the bodies do not remain in a uniform planar stream. Frequently a more accurate sorting operation may be carried out if the bodies maintain a uniform distance from a transverse reference in the sorting zone. In the embodiment shown a translucent plate 24 is included in the path of the bodies through zone 23. The bodies 10 slide down this surface past the sorting detector.

A light 25, which may be a fluorescent light, is positioned to one side of the sorting zone behind plate 24 so that it directs a transverse beam of light into the sorting zone. The light in the sorting zone is preferably indirect or dispersed such as might be caused by providing a frosted coating on plate 24.

Throughout the description, when reference is made to light, it is the intention that this should include not only visible light radiation but also radiation in the infra-red and ultra-violet regions. The light radiation or simply "light" that is most suitable for a particular sorting operation is readily determined.

On the opposite side of the sorting zone from light 25 is a monitor 26 which includes a photometric light detector and a scanning device. The use of the term "photometric" is intended to convey that a measuring of the light occurs, that is, the response is quantitative rather than just qualitative.

The monitor 26 is described in detail hereinafter and it is directed towards light 25 so that light from the light 25 is received by the light detector therein in the form of a scan. In other words the light detector looks at a portion of the light from light 25, and the portion of light seen by the detector moves in a direction across the direction of stream flow. The monitor provides an output signal that is representative of the translucency of each body of salt in the path of the scan. The part of the output signal representing a particular body is related to the position of that body from the side of the stream because the scan proceeds across the stream from one side to the other. The output signal representing a single scan may be divided into a convenient number of portions, effectively dividing the stream into the same number of imaginary portions. In the embodiment shown the scan is divided into ten portions. A particular body will thus cause an indication in the output signal related to the portion of the stream in which the body moves through the sorting zone.

As the stream continues through the sorting zone past the monitor 26 it passes ten adjacent air blast nozzles 27 which are part of the rejection means. The air blast nozzles 27 which extend the width of the stream are each associated with a respective portion of the stream as divided in the output signal. An air supply 28 feeds ten control valves 30 which supply respective nozzles.

The output signal from monitor 26 is compared with a reference. That is, the part of the signal representing each body scanned is compared to a reference. The apparatus may be arranged to actuate the respective rejection means if the compared signal either exceeds or is less than the reference. In the embodiment shown the apparatus actuates the control valve for that portion of the stream in which a particular body is travelling if the body is opaque enough to reduce the light by a predetermined amount. The rejected bodies are deflected by the air blast to a reject bin 31 while the accepted bodies fall into an accept bin 32.

The air blast is timed to begin operation at the time the lowest part of a body is entering the effective blast region in front of a nozzle 27 and to terminate as the body leaves this region. The vertical dimension of the opening in nozzle 27 is kept small to direct the air blast at the stream with little vertical spread. This reduces the chance of an acceptable body, preceding or following the rejected body, being carried over by the edge of the blast into the reject bin. As an example, in the particular embodiment being described, the slot may be of the order of 0.040 inch in height. The height could, of course, vary over a large range depending on the particular circumstances involved.

It will be obvious that a mechanical rejection system could be used in the sorting apparatus of this invention if the rejection system is fast enough for the particular separation of succeeding bodies in any given portion of the stream. However, mechanical systems, where plates or the like are moved to deflect rejected pieces, are generally slow acting and are therefore not preferred.

In order to reduce the dust and other undesirable light particles in the sorting zone, it may be desirable to include an exhaust fan 33 in the wall of housing 34 around the sorting zone 23. This will help reduce fine particles of salt carried along with the stream or adhering to the salt bodies and dislodged by the jet of air from nozzles 27.

One variation of the embodiment of FIGURES 1 and 2 does not make use of a scanning means. This variation uses one light detector for each air blast nozzle. The stream is thus divided into portions with one detector providing the output signal for the bodies passing in front of it, and this signal is compared with a reference. If a predetermined relationship exists between signal and reference, the respective control valve is actuated to direct a blast of air at the body causing the signal and thus deflect it. While this variation requires no scanning means, it does necessitate a plurality of detectors and associated circuitry.

Referring now to FIGURE 3, a portion of the sorting zone of another embodiment of the invention is shown. This embodiment bases its sorting decision on the reflectance characteristics of the bodies being sorted rather than translucency. A light source 35 floods the sorting zone with light which is reflected by the various bodies 10 passing through the sorting zone in accordance with the reflectance characteristic of the surface of the bodies. The monitor 26 scans the sorting zone as before and provides an output signal that is representative of the reflectance of each body related to the portion of the stream in which the body moves.

When sorting is being done in accordance with reflectance characteristic, it is desirable that the reflected light should not be specular light. For the purposes of this description reflected light may be termed specular or diffuse where specular light is light reflected by relatively small, highly polished reflecting surfaces and diffuse light is light reflected generally from other surfaces. The level of specular light reflected from a unit area would be many times the value of diffuse light reflected from the same area. Consequently, if the surface of a body of material reflects both specular and diffuse light, it is quite possible that the amount of specular reflected light would be large enough to swamp any indication of the amount of diffuse reflected light. It is the diffuse light that gives a more precise indication of the reflectance characteristics that are of interest, such as, for example, changes of reflectance due to different surface colours.

In the FIGURE 3 embodiment, to reduce the amount of specular reflected light received by the light detector in monitor 26, a first polarizing filter 36 may be positioned in front of light source 35 to polarize the light directed into the sorting zone in a first direction. Another or second polarizing filter, polarized in a direction at right angles to the first direction is placed in the path of reflected light travelling to the light detector. A suitable position for such a second polarizing filter is described in connection with FIGURE 4. The combination of the two filters reduces the effect of specular reflected light to a negligible amount.

FIGURE 4 is a cross-sectional view of a monitor 26 which may be used in either of the previously described embodiments with only minor changes. The monitor 26 has a tubular housing 40 with a front closure 41 and a back closure 42. Sealing rings 43 and 44 are used to make the interior of the monitor housing dustproof. The front closure 41 has an opening 47 and a collimator 48 projecting outwards to admit light from the sorting zone to the interior of the monitor housing.

It may be desirable to close opening 47 with a transparent material to prevent the entry of dust. Alternately, depending on the dust concentration, a water or air curtain may be used across the opening. In addition, an opening may be provided in housing 40 through which compressed air is introduced to create a small pressure within the front part of the housing and to establish an outward flow of air. The dust conditions in a particular sorting operation will indicate the extent of the dust proofing necessary.

Partition members 45 and 46 form a mounting means for the photometric light detector and scanning means. The members 45 and 46 may be positioned by some means such as spacer bars 50 and 51. The member 45 supports a filter and lens assembly comprising a colour filter 52, a Polaroid filter 53, an auxiliary lens 54 and a projection lens 55. The filters 52 and 53 and lens 54 may or may not be used depending on the requirements of a particular sorting operation. Filter 52 is used when it is desired to attenuate light of a certain colour. For example, bodies to be sorted may have varying amounts of two translucent portions each of a different colour. To sort these bodies by the colours in the translucent portions may require a suitable colour filter 52 to attenuate one of the colours. For another example, bodies to be sorted may have varying amounts of two surface colours. To sort these bodies by reflected diffuse light according to colour may require a suitable colour filter 52 to attenuate one of the colours.

The Polaroid filter 53 may be used, as was previously mentioned, when sorting by reflectance to reduce specular reflection, and the auxiliary lens may be used to make adjustments in the focusing. None of the filters 52, 53 or lens 54 are required for the preferred embodiment for the sorting of salt.

The projection lens 55 is a wide angle lens to enable the entire width of the stream of bodies being sorted to be focussed on a horizontal slot 56 in a mask 57. Any lens system suitable for directing light from the sorting zone over the width of the stream onto slot 56 can be used. The lens 55 is shown as a unit for convenience but it may comprise several lenses or components.

A scanning disc 60 is mounted to shaft 61 rotatably supported in bearings 62. The scanning disc is better seen in FIGURE 5 and has a series of radial apertures 63 spaced around it. A series of ten peripheral gating slugs 70 are associated with each slot, and one reset slug 71 is associated with each slot. The slugs 70 and 71 may be of magnetic material such as iron or the like but they are preferably of a magnetic material like Alnico. The purpose of these slugs 70 and 71 of magnetic material will be discussed subsequently.

As shown in FIGURE 4, the scanning disc 60 is positioned so that its apertures 63 are just behind slot 56 in mask 57. A high speed motor 64, which may be an electric motor or an air driven turbine, for example, drives shaft 61 and scanning disc 60.

Member 46 supports another lens system, comprising lenses 65 and 66, a photometric detector 67, and a magnetic pick up assembly 68 comprising a gate pick up head 72, a reset pick up head 73, and a magnetic head adjustable mount 74. The lens system serves to project light from apertures 63 onto the cathode surface of a photomultiplier tube 75 which comprises the photometric detector. As before, any suitable known lens system may be used.

The adjustable mount 74 is pivotally connected to partition member 46 by a screw member 76 and it is secured in a desired pivotal position by a clamping screw 77. The mount 74 is adapted to hold gate pick up head 72 and reset pick up head 73 at the positions indicated in phantom on FIGURE 5. Pivotally changing the position of mount 74 will change the time in the scan at which a particular slug passes its pick up head.

As the scanning disc 60 rotates the disc apertures 63 move past slot 56 creating a small light opening which moves horizontally across slot 56. This sweeping movement of the common light opening is referred to as a scanning movement and a light detector positioned behind the light opening is said to scan an object placed in its view on the other side of the opening. Such a mechanical scanning system is known in the television, facsimile and analogous arts. As each slug 70 passes the pick up head 72 a short pulse is generated. It will be seen that there are ten pulses per scan, and these pulses are used to divide the output from the photometric detector 67 (and thus the stream of bodies being scanned) into ten portions. The pulses generated as each slug 71 passes the pick up head 73 are reset pulses used to reset the apparatus at the end of a scan. This will be discussed in more detail in connection with the circuitry.

It will be apparent that a fairly rapid scan is required when the bodies of material being sorted are relatively small and are accelerated through the sorting zone. It has been found that in the apparatus used in the preferred embodiment for sorting salt, satisfactory operation is achieved with disc speeds of the order of 12,000 to 15,000 r.p.m. At 12,000 r.p.m., with six scanning slots on the disc, this would give $$\frac{12,000}{60} \times 6 = 1,200 \text{ scans per second}$$

Faster scanning may be achieved both by increasing the rotational speed and the number of slots on the scanning disc. The only limitations are the practical physical limits imposed. It will be apparent to those skilled in the art that an electronic scan may also be used. Electronics scanning systems, such as are used in television cameras and the like are adaptable to use in this invention and are capable of rapid scanning.

Under some circumstances it may be desirable to scan opposite sides of the stream as it moves through the sorting zone. This can be done by having a scanning means and photometric detector on each side of the stream. The scanning means on each side should be synchronized to be scanning the same portion of the stream, and only one rejection means is required.

It will be apparent that the rejection means must have a rapid response when the bodies of material being sorted are accelerating through the sorting zone under the influence of gravity. This is particularly so when the bodies of material are relatively small and are not spaced apart any great extent, for example, as in the preferred embodiment for sorting bodies or cystals of salt. A control valve 30 which has been found satisfactory in this embodiment is shown in FIGURE 6. This valve is capable of completing a blast cycle in about ten milliseconds. A brief description of this valve is given below.

Referring to FIGURE 6, the valve 30 has an upper and lower casing 80 and 81 secured together in air tight relation by means such as screw 82 and seal 83. The lower casing 81 has a chamber 84 containing a liner 85 which may be of brass or Teflon or like plastic material. The liner 85 makes a sealing engagement with the wall of chamber 84 and end pieces 86 and 87 close the upper and lower ends of chamber 84. An air supply inlet passage 88 extends through casing 81, at right angles to the axis of chamber 84, entering chamber 84 between the liner 85 and lower end piece 87. An air outlet passage 90 from chamber 85 is axially located and extends through end piece 87 as shown. A movable valve member 91 is mounted for reciprocating movement within chamber 84 where it slidably engages liner 85. A sealing ring 92 may be set in a circumferential groove in valve member 91 to create a seal between member 91 and liner 85. When the valve member 91 is in its lower position it covers the air outlet passage 90 as shown, and when it is in its upper position there is an air path from inlet 88 to outlet 90.

In order to have a rapid opening and closing of the outlet 90, the valve member is made of a light material, such as, for example, nylon or other suitable plastic material. In addition the length of travel of valve member 91 is kept small.

Upper casing 80 has a solenoid coil holding chamber 93 closed by a top cover 94. In chamber 93 there is mounted a solenoid coil 95 and a solenoid plunger 96. Centrally in the ends of plunger 96 there are upper and lower valve seats 97 and 98 respectively. The plunger 96 has a short reciprocating travel. In its upper position the valve seat engages a fixed insert member 100 closing a pilot air inlet passage 103 extending through insert 100. In its lower position, as shown, the valve seat 98 engages a fixed insert 101 closing a pilot air exhaust outlet passage 104. There are sealing rings between casing 80, coil 95 and insert 100 to prevent the escape of pilot air.

An air passage 105 extends through solenoid plunger 96 from one end to the other. When the plunger 96 is in its lower position, the passage 105 communicates with pilot air inlet 103 and an air chamber 106 within casing 80. Another air passage 107 opens into chamber 106 at one end, extends through casing 80 and end piece 86, and opens into chamber 84 above the valve member 91. Shallow slots 108 across the face of the valve member provide a greater exposed surface of the end of member 91 when it is in its upper position.

In operation, it will be understood that air supply inlet 88 is connected to a gas source, such as air, for example air supply 28 in FIGURES 1 and 2, and the pilot air inlet 103 is also connected to a gas source, such as air, which may, for example, be air supply 28 of FIGURES 1 and 2. It should be noted here that the main air supply and the pilot air supply may be the same and consequently have the same pressure, for example, of the order of 80 p.s.i. The control valve will operate satisfactorily under these conditions. However, it has been found that more positive operation is achieved when the pilot air supply is at a slightly higher pressure than the main supply, for example, of the order of 90 p.s.i. The air outlet 90 will be connected to a required output, such as one of the air blast nozzles 27 of FIGURES 1 and 2.

When the solenoid coil 95 is de-energized, pilot air flows into valve 30 through inlet 103 and passes through the passage 105, air chamber 106, and passage 107, to cause a force on valve member 91 pressing it downwards. It will be seen that there is an opposing upwards force caused by the air from air inlet 88, however, because of the different areas over which the opposing pressures have an effect, the downwards force is greater keeping the member 91 in its down or closed position.

With the solenoid coil 95 energized, the plunger 96 moves upwards, closing pilot air inlet passage 103 and opening chamber 106 to atmosphere by way of exhaust outlet 104. The pressure on the top of valve member 91 tending to hold it downwards is removed. The light weight valve member 91 is quickly moved to its upward position because of the air from main inlet 88 tending to flow beneath the member 91.

While this valve is preferred because of its very rapid opening and closing action, valves of other constructions may be used in this invention.

To summarize very briefly thus far, the sorting apparatus of the preferred embodiment described has a vibrating table feeder which feeds a wide path random stream of bodies of material (crystals of salt in this embodiment) to a sorting zone where the bodies fall through the sorting zone under the influence of gravity. A scanning device scans across the stream and a detector obtains information as to the translucency of each body related to its position from a side of the stream, and also information as to the time the body passes the scanner and detector. The apparatus then compares a signal representing the translucency of each body with a reference and makes a decision whether to accept or reject the body. The apparatus locates the body in a portion of the stream (there are ten portions used in the embodiment described) and if a particular body is to be rejected a control valve associated with the same portion of the stream is energized and an air blast directed at the particular body to deflect it from its path. Timing means provides the control valve energization at the time when the particular body is in front of the air blast nozzle.

Continuing with a description of the circuitry and apparatus of the invention, reference is made to FIGURE 7, which is a simplified block diagram of the circuitry and apparatus used in the embodiment of FIGURES 1 and 2, and to FIGURE 8, which shows waveforms occurring in the circuitry depicted in FIGURE 7 and which are useful in describing the operation of FIGURE 7.

In FIGURE 7 the sorting zone 23 of FIGURES 1 and 2 is indicated generally by dashed lines. The salt bodies or salt crystals 10 pass between a light source 110, which includes light 25 of FIGURE 1, and the photometric light detector 67 of FIGURE 4. A scanning device 111 comprises the combination of mask 57 and scanning disc 60 of FIGURE 5, along with the driving motor 64 and magnetic pick up heads 68 of FIGURE 4. The output from the magnetic pick up assembly comprises gating pulses from gate pick up head 72 and reset pulses from reset pick up head 73 (FIGURE 4). The gate and reset pulses, which are indicated in FIGURE 8 as W1 and W2 respectively, are caused by the slugs passing the respective pick up heads. It will be seen that there are ten gate pulses and one reset pulse. These gating and reset pulses appear at 112 and 114 and are amplified in amplifiers 115 and 116, squared in squarer circuits 117 and 118 respectively, and applied to a circuit including four binary stages represented by block 120. The four binary stage circuit 120 is a known circuit where four multivibrators are connected in series. In this circuit the first multivibrator switches at each applied trigger pulse, the second multivibrator is triggered by pulses from the first and switches at the second, fourth, sixth and eighth of the original trigger pulses, the third multivibrator is triggered by pulses from the second multivibrator so that it switches on the fourth and eighth of the original pulses, and the fourth multivibrator is triggered by the third so that it switches on the eighth pulse. In the circuitry of this embodiment the ten gating pulses of W1 as amplified and squared, trigger the four binary stages to ten distinct states of conduction and then the applied reset pulses resets the four stages to their original conditions. The outputs from the four binary stages 120 are applied to ten gate stages 121 so that each of the gate stages is triggered on in succession. The waveform W3 in FIGURE 8 shows a waveform that represents the second gate, that is the gate triggered on by the second pulse. The square wave portion 122, which extends in upwards in a positive direction, represents the time during which the gate is on or open. There are ten such gates open at different times by the gate trigger pulses.

In addition a trigger pulse from the binary stages 120 is used to trigger two single shot multivibrators 133 and 138 as will be described later.

The video signal or output from the light detector 67 is amplified in a D.C. amplifier 123 and applied to an amplitude discriminator 124. The amplified output from the photometric light detector 67 would be of the form shown as waveform W5 in FIGURE 8 as it might be with a single opaque salt crystal appearing in the scan. The pulse 125 representing the salt crystal is in the second portion of the stream of crystals as shown. The amplitude discriminator 124 is set at a level 126 as seen in W5 of FIGURE 8 such that pulses below this level cause no output and pulses exceeding this level produce a pulse 127 which is passed by a cathode follower 128 to the ten gate stages 121. When a pulse is applied by cathode follower 128 to the ten gate stages it is passed through whichever gate is open at the time, in this case the second gate, to a respective second stage in the ten pulse stretch stages 130. Each stage in the ten pulse stretch stages 130 is associated with a respective stage in the ten output control stages 131 and with a respective one of the ten air blast devices 132. The pulse stretch stages 130 serve to lengthen an applied pulse so that a respective control stage will turn on a blast in the respective nozzle for a time duration extending substantially the length of time a particular undesired body or crystal is in front of the air blast nozzle 27 (FIGURE 1).

As was previously mentioned, a trigger pulse from four binary stages 120 is used to trigger two single shot multivibrators, hereinafter referred to as SSM. One of these SSM is 133 which drives a gating stage 134 to permit operation of amplitude discriminator 124 only during the time the sorting zone is being scanned. That is, the amplitude discriminator 124 is gated on while the scan passes over the width of the stream of bodies passing through the sorting zone. The waveform W4 of FIGURE 8 indicates the length of time the amplitude discriminator 124 is gated on. This prevents an output from the discriminator 124 due to a decrease in light received by detector 67 as the scan passes the end of light source 110. It will be apparent that if such an output did occur it should not result in action of the rejection means as there would be no gate in the ten gate stage 121 open during the time there is no scan. However, the amplitude discriminator gate prevents such an output and ensures there is no unwarranted action of the rejection means.

It will be recognized that D.C. amplifiers tend to drift and some form of stabilization is required, and also that compensation should be made for variations in light in the sorting zone. Two control systems stabilize the output from amplifier 123. The first of these systems uses an automatic gain control circuit or AGC circuit 135. This AGC circuit 135 which receives an amplified signal from the amplifier 136, may comprise a D.C. level control and a peak detector. Changes from a reference set by the D.C. level control are detected and used to vary the output voltage of the power supply for the light detector 67. As the overall light level in the sorting zone increases the power supply voltage is decreased to lower the gain of the detector. This stabilizes the output of amplifier 123 as far as gain is concerned. It is also desirable to ensure that the zero level or baseline does not drift. A zero control 137 does this by ensuring that the output of amplifier 123 is zero when there is a no signal condition, that is when the light is stopped from entering light detector 67.

The circuit for zero control receives a gating signal from SSM 138 (triggered from the binary stages 120) and gating stage 140. The gate voltage from stage 140, which may be as shown in waveform W7 of FIGURE 8, gates the long tail pair 141 into operation at a time when there is no scan as shown by the positive going pulse 142. The operation of the long tail pair 141 will be discussed in more detail hereinafter when the different circuits are described. Briefly, the circuit of 141 receives a signal from amplifier 123 and the level of this signal in the gated no signal time of the scan is used to adjust a bias voltage applied over 143 to the D.C. amplifier 123. This bias keeps the no signal part of the signal at a zero level.

It is believed that the description thus far adequately discloses the invention, however, a description of circuitry suitable for use in a specific embodiment follows by way of example. It will be understood that in many cases there are circuits equivalent to those described which would operate satisfactorily.

Reference to FIGURE 16 will indicate the layout of the circuit diagram of FIGURES 9-15 which are suitable for use in the embodiment described for sorting salt crystals. Where portions of a circuit extend from one figure to another figure, designation terminals have been included on the circuits where the two figures join to assist in following the circuitry.

In the schematic circuit diagrams used in the description of the invention, certain obvious parts and components have been omitted to simplify the diagrams. Such omissions will be readily recognized by those skilled in the art and will not affect a proper understanding of the invention. For one example, the heater or filament connections for the tubes have not been shown. For another example, the positive and negative power supplies have not been shown but have been indicated by B+ and B− symbols for the higher voltages and C+ and C− for the lower voltages. Such connections and power supplies are well known.

Referring now to FIGURE 9, there is shown a schematic circuit diagram of the pick up heads and associated transistor amplifiers which amplify the pulses from the pick up heads. Coil 150 is the coil in pick up head 72 (FIGURES 4 and 5) which provides a signal to transistor 151 substantially of the waveform W1 of FIGURE 8. The gate pulses of waveform W1 are amplified by transistors 151 and 152 and the amplified gate pulse signal appears at terminal AA. Similarly, coil 153 is the coil in pick up head 73 (FIGURES 4 and 5) which provides a reset pulse signal of the waveform W2 of FIGURE 8 to a transistor amplifier comprising transistors 154 and 155. The amplified reset pulse signal appears at terminal AB. The transistor amplifiers are of conventional design.

It will be seen that the instant at which the slugs pass the pick up heads corresponds to the parts of the waveform where the signal excursion goes abruptly from positive to negative through the zero or reference level (or from negative to positive depending on the coil connections). Such a point, for example, is at 156 on W1 of FIGURE 8. This point not only represents the time the slug is opposite the pick up head, but it is a point on the waveform that is substantially independent of irregularities in the magnetic properties of individual slugs. Consequently this transition point is the most desirable point from which to develop trigger pulses for timing the operation of circuits to be described hereinafter. The manner in which a trigger pulse is developed from this transition point will be apparent from the following description of FIGURE 10.

Referring to FIGURE 10, the gate pulse signal at AA is applied to the grid of tube 157 over resistance 158. Two oppositely poled diodes 160 and 161 are connected across the input to tube 157 to limit the positive and negative going portions of the gate signal. This, in effect, begins to square the gate pulses. The amplified gate pulse signal from tube 157 appears across load resistance 163 and is applied over capacitor 164 and resistance 165 to the grid of tube 162A. The two halves of tube 162, designated 162A and 162B, form a squaring circuit (squarer circuit 117 of FIGURE 7). The action of the squaring circuit is as follows. With the grid of tube 162A negative the plate current is cut off and the plate voltage is high. A portion of the voltage on the plate is applied to the grid of tube 162B through a divider comprising resistances 166 and 167. The lower end of the divider is connected to the negative supply and the resistance values chosen so that the grid of tube 162B is positive when tube 162A is cut off. Tube 162B is therefore conducting when tube 162A is cut off. The voltage drop across resistance 168 caused by plate current flow in tube 162B is applied to the cathode of tube 162A. As the grid voltage increases in a positive direction on tube 162A it begins to conduct increasing the voltage drop across resistance 168 and lowering the plate voltage on tube 162A. The reduction in plate voltage acts through resistance network 166, 167 to change the grid voltage on tube 162B in a negative direction tending to decrease current through tube 162B. This reduces the potential across resistance 168 and encourages tube 162A to increase its conduction. The reaction is regenerative so that almost immediate transfer of conduction takes place from tube 162B to 162A. The reverse action takes place when the voltage on the grid of tube 162A is changed in a negative direction. Thus, if a gate pulse swinging in a positive direction from a reference, then quickly negative, and then returning to the reference level, is applied to the grid of tube 162A, a rectangular output wave appears at the plate of tube 162B having a positive going excursion and a negative going excursion. The point at which this output wave changes abruptly from its positive going to its negative going excursion corresponds to the time at which the slug initiating the wave passes the pick up head. This output at the plate of tube 162B is passed through a differentiating network to conductor 170 where it appears as wave 169 shown adjacent the conductor. The negative spike, caused by the abrupt positive towards negative change, is used to trigger the first stage of the four binary stages (120 of FIGURE 7) comprising four double triode tubes. The two sections of the first tube are designated 171A and 171B, the second tube 172A and 172B, and the third and fourth tubes 173A and B and 174A and B respectively. The tubes 171A and 171B are connected as a first multivibrator, tubes 172A and 172B are connected as a second multivibrator, and so on. The four multivibrator circuits are connected in a series string as will be described.

The reset pulse signal at terminal AB is similarly treated by an amplifier tube 175 and a squarer circuit (118 of FIGURE 7) comprising tube sections 176A and 176B.

The action is the same as that described for the circuits, including tubes 157, 162A and 162B. The output from tube 176B is differentiated and appears on conductor 177 where it is used to reset periodically the four multivibrators of the four binary stages.

It will be recalled that there are a series of ten gating slugs which cause ten trigger pulses of the form of 169 on conductor 170. Two diodes 178 and 180 and two resistances 181 and 182 respectively, connect conductor 170 to the grids of tubes 171A and 171B, the first multivibrator. The diodes 178 and 180 are so poled that they conduct when conductor 170 is negative with respect to the grids. The grids are substantially at ground potential because of the cathodes being grounded. Consequently only the negative going portions of the ten trigger pulses cause the diodes to conduct and apply a short negative going pulse to the grids. At the beginning of a series of ten gating pulses, tube 171A is conducting and tube 171B is cut off. The first negative going trigger pulse will have no effect on the grid of non-conducting tube 171B, but on the grid of tube 171A it will tend to reduce current flow through this tube and initiate the switch over of the multivibrator to a condition where tube 171B is conducting and tube 171A is cut off. In a like fashion, the second negative going trigger pulse will have no effect on the non-conducting tube 171A, but will initiate the transfer of conduction from tube 171B and to tube 171A. This multivibrator action is well known. Thus, the ten trigger pulses will switch the first multivibrator ten times.

The plate of tube 171A is connected through a differentiating network to conductor 183. When tube 171A is conducting, the voltage on its plate is low. The first trigger pulse will switch the first multivibrator resulting in a positive going pulse on conductor 183. The second trigger pulse will result in a negative going pulse on conductor 183, and the third a positive going pulse, and so on. The second multivibrator, which comprises tubes 172A and 172B, has its grids connected to conductor 183 by resistances 184 and 185 and diodes 186 and 187 as shown. As before, the diodes 186 and 187 are poled to pass only the negative going pulses to the grids of the multivibrator, and these negative pulses occur on the second, fourth, sixth, eighth and tenth of the original series of ten gating pulses. The second multivibrator, at the beginning of the series of ten gate pulses, is in the condition where tube 172A is conducting, and tube 172B is cut off. The negative pulses on conductor 183 switch it to its other state or condition at time corresponding to the second original gate pulse, back at the fourth, to its other state again at the sixth, etc. The second multivibrator thus switches at half the rate of the first multivibrator.

Similarly, the plate of tube 172A is connected through a differentiating network to conductor 188. The conductor 188 will have a positive going trigger pulse which corresponds to the second of the original gating pulses, a negative going trigger pulse corresponding to the fourth original gating pulse, and so on. As before, the negative going pulses on conductor 188 are used to switch the third multivibrator, comprising tubes 173A and 173B.

The fourth multivibrator comprising tubes 174A and 174B operates in exactly the same manner, and it is believed no further description is necessary. A reset pulse, which is generated following a series of ten gating pulses, is on conductor 177. Diodes 190, 191, 192 and 193 are poled to conduct when the side of the diodes to conductor 177 is negative with respect to the other side. Thus the negative going part of the reset pulse causes negative bias voltage pulse on the grids of tubes 171B, 172B, 173B and 174B respectively, to ensure that all the multivibrators are switched to their original condition ready for the next set of ten gating pulses.

The plate of each tube in the four multivibrator stages is coupled through a divider network to an individual terminal designated P1 to P8. Each of these terminals will have a higher or a lower voltage depending on whether the tube to which it is connected is non-conducting or conducting. The following Table I indicates whether the voltages are higher (H) or lower (L), by way of example

| Pulse | P1 | P2 | P3 | P4 | P5 | P6 | P7 | P8 |
|---|---|---|---|---|---|---|---|---|
| Reset | L | H | L | H | L | H | L | H |
| 1 | H | L | L | H | L | H | L | H |
| 2 | L | H | H | L | L | H | L | H |
| 3 | H | L | H | L | L | H | L | H |
| 4 | L | H | L | H | H | L | L | H |
| 5 | H | L | L | H | H | L | L | H |
| 6 | L | H | H | L | H | L | L | H |
| 7 | H | L | H | L | H | L | L | H |
| 8 | L | H | L | H | L | H | H | L |
| 9 | H | L | L | H | L | H | H | L |
| 10 | L | H | H | L | H | L | H | L |
| Reset | L | H | L | H | L | H | L | H |

*Table I*

The purpose of the four binary stages is to provide ten distinct combinations of higher and lower voltages, one for each gate pulse, which cause ten different gates to be opened in sequence. This will be described in connection with FIGURE 11.

Referring now to FIGURE 11, there are ten gating stages designated 194–203. The gating stages are similar and only stages 194 and 203 are shown in detail, the remainder being indicated by dashed blocks. Each gating stage is connected to certain of the terminals P1 to P8 through a diode logic network. Considering first the gating stage 194, it includes a tube 205 having three grids— the first and third grids being control grids or gating grids. The first grid is connected to point 206 to which the same terminal of four diodes 207 to 210 are connected. The other terminal of diode goes to terminal P1, and of diodes 208, 209 and 210 to terminals P4, P8 and P6 respectively. The diodes are poled to conduct when the terminal side has a lower voltage than point 206. The connection point 206 is connected to a source of positive voltage B+ through a fairly high resistance 211. The previously referred to higher and lower voltages on the terminals P1 to P8 are chosen so that the higher voltages will not cause the diodes, that is diodes 207–210, to conduct but the lower voltages will. Thus, if there is a lower voltage on terminal P1, diode 207 will conduct and will cause the voltage at point 206 to fall biasing the grid of tube 205 to prevent conduction. In this condition the gating tube 205 is closed. The will happen if there is a lower voltage on any of terminals P1, P4, P6 or P8. However, if all the terminals P1, P4, P6 and P8 have higher voltages, none of diodes 207–210 will conduct and the voltage of connection point 206 will increase positively from the B+ supply until there is conduction in gating tube 205 from cathode to second grid. In this condition the gate tube 205 is open. Plate current does not flow in tube 205 because of the negative bias on the third grid. However, if a positive going pulse is applied to terminal HB, plate current will flow, an output pulse will be developed across load resistance 212, and the output will appear at terminal EA.

Reference to Table I will show that there is a higher voltage on terminals P1, P4, P6 and P8 immediately following the first gating pulse, that is, from the first to the second gating pulse. This is the only time the gating stage 194 is open. Similarly terminals P2, P3, P5 and P6 are in a condition to open the second gating stage 195 between the second and third gating pulses. It will be apparent from Table I that the gating stages are opened in sequence, and a pulse applied to terminal HB will result in an output from whichever gate is open at the time. It is believed that a description of each gating stage is unnecessary. It will be recalled that any pulse appearing at the terminal HB (which is a pulse from cathode follower 128 of FIGURE 7 delivered to gate stages 121) has a time relation with respect to the sequence in which the gates are opened. In other words, the sweep of the sorting zone which may result in a pulse at HB is timed with respect to the gating sequence so that the required gate is open when a pulse appears at HB.

When there is a pulse at terminal RB, an output pulse will appear at one of the ten terminals designated EA, EB, EC, ED, EE, EF, EG, EH, EI or EJ, depending on which gate stage is open. This pulse will result in operation of the control valves 30 of FIGURES 1 and 2 to direct an air blast from one of the ten nozzles 27 of FIGURES 1 and 2 to reject (or accept) a particular body of material which caused the pulse.

Referring now to FIGURE 12, each of the terminals EA to EJ at the upper left of the drawing is connected to a grid input circuit of a pulse stretch stage 214 to 223. These are the stages represented by block 130 of FIGURE 7. Each of these stages is the same and only the first stage 214 and last stage 223 are shown in detail, the remaining stages being indicated by dashed blocks.

The purpose of the pulse stretch stages 214–223 is to lengthen the short pulse at any of the respective input terminals EA to EJ to provide a control pulse operating the control valve of sufficient length that it extends substantially the length of time it takes a body of material to fall past the region of the air blast nozzle. Each pulse stretch stage comprises a SSM. Considering the first stage 214, a two section tube 224A and 224B is connected as a SSM with 224A normally conducting. A positive adjustable bias is placed on the grid of tube 224A by a divider network comprising resistance 225, 226 and potentiometer 227 connected between a source of positive potential B+ and ground. A divider network comprising resistances 228, 230 and 231 between a positive voltage source B+ and a negative voltage source B− is used to bias the grid of tube 224B so that tube 224B is normally cut off. The circuit is a typical SSM circuit having means for adjusting the length of time the circuit is in its switched condition before it returns to its normal condition. A diode 232 is connected between the appropriate terminal, say EA, and the grid circuit of tube 224A. The diode 232 is poled to conduct when a negative going pulse is on terminal EA. When this happens, the grid potential of 224A becomes more negative tending to stop current flow through tube 224A, applying a positive going voltage to the grid of tube 224B, thereby transferring conduction from tube 224A to tube 224B. After a time which is dependent upon the time constants and voltages in the circuit, the grid of tube 224B becomes sufficiently negative to reduce current flow in tube 224B applying a positive going pulse to the grid of tube 224A and thereby restoring the SSM to its normal condition. This action is the same for each pulse stretch stage.

Following each pulse stretch stage is a respective output control stage (comprising the ten output control stages 131 of FIGURE 7) and a respective solenoid which operates one of the control valves 30 of FIGURES 1, 2, and 6. The output control stages 233 to 242 are similar and stages 235–240 are indicated in phantom block form only. There are ten solenoid coils 244 to 253 each one controlled by a respective one of control stages 233 to 242.

Considering the first output control stage 233 and its solenoid 244, there is shown a tube 255, which may be part of a multi-section tube, having a grid resistance coupled to the plate of tube 224A. A resistance divider network comprising resistances 228, 256 and 257 connected between a source of positive voltage B+ and ground provides a voltage for the plate of tube 224A and this voltage is applied to the grid of tube 255 because of the resistance coupling. The cathode of tube 255 is connected to a source of positive potential B+ having a value such that tube 255 is normally cut off. It will be recalled that SSM 214 is switched by a trigger pulse causing the voltage at the plate of tube 224A to rise. This rise is transmitted to the grid of tube 255 causing conduction until SSM 214 returns to its normal state. The plate circuit for tube 255 includes solenoid coil 244 and floating power supply 258. The flow of plate current through tube 255 energizes solenoid 244 turning on the air blast. The other control circuits operate in a similar manner.

The scanning, regulating and decision circuits will now be described. Referring first to FIGURE 13, there is shown the light detector 67, part of D.C. amplifier 123, amplifier 136 and automatic gain control circuit (AGC circuit) 135 or FIGURE 7. The photomultiplier tube 75 has a cathode on which the light from the scanned sorting zone impinges. An output dependent upon the impinging light appears across resistance 260. A negative voltage from the low voltage power supply C− is applied to the last dynode in the photomultiplier tube 75, while the third last dynode is connected to a negative source B− and the remaining dynodes are supplied with a negative potential, through a resistance network from a conductor 263 connected to a power supply of variable high voltage. Since the gain of a photomultiplier tube is dependent to a large extent on the potential between dynodes, the adjustment of this potential affords a convenient means of controlling the gain of the light detecting system to maintain a predetermined standard.

The light dependent signal across resistance 260 is amplified by a conventional direct coupled transistor amplifier comprising transistors 261 and 262, and the amplified video or light signal appears at terminal FA. Two zener diodes 264 and 265 are included in the circuit to produce suitable regulated voltages supplying the collector and emitter circuits of transistors 261 and 262. The amplified signal representing the light received from a scanning of the sorting zone may be referred to as the amplified video signal and is available on conductor 266 and terminal FA.

It will be recalled that it is desirable to control the gain of the light detector and D.C. amplifier so that a substantially constant level of output video signal is obtained regardless of changes in light level in the sorting zone and that a convenient way of doing this is to adjust the negative power supply on conductor 263. To accomplish this the video signal from conductor 266 is applied to a conventional R-C coupled amplifier (amplifier 136 of FIGURE 7) comprising tubes 267A and 267B providing an output via capacitor 268 to a D.C. level control comprising tube 270. The cathode of diode tube 270 is connected to a positive source of potential from a divider comprising resistances 271, 272 and 273 connected in series between a source of positive voltage B+ and ground. A variable tap on resistance 272 provides a variable reference positive potential for the D.C. level control. Portions of the video signal at the plate of tube 270 which exceed the reference cathode potential cause conduction in the diode 270 holding the positive going portions of the signal on the plate of diode 270 to a fixed level. Thus, the signal applied to the grid of cathode follower tube 274 has a fixed reference level with negative going portions from this level in accordance with the values of light received by the photomultiplier tube 75 during scanning. The maximum or peak negative going value of the signal represents the condition where unobstructed light is received. A divider network comprising resistances 277 and 278, series connected between a source of negative potential B− and ground, is connected at the junction of the resistances to the cathode of tube 274 and the cathode of a peak detector tube 275 supplying the cathodes with a negative potential. The output of the cathode follower tube 274 is across the resistance 278. The plate load of peak detector tube 275 is a parallel combination of resistance 280 and capacitance 281. It will be seen that a negative voltage is developed across the peak detector plate load and that this voltage varies at the peak or maximum negative going value of the video signal. This voltage across the peak detector load is coupled to the grid of tube 282A which is the first stage of a D.C. amplifier comprising tubes 282A and 282B.

The D.C. amplifier is conventional and its output is coupled through resistance 283 to the grid of power supply control tube 284 which is in series with the high voltage supply.

The high voltage supply is a conventional one comprising a transformer 285 with its primary winding connected to a source of alternating power and its secondary connected to a half wave rectifier indicated as diodes 286. The pulsating direct current is filtered by a choke 287 in combination with capacitors 288 and 290. The output from the supply is applied over conductor 263 to photomultiplier tube 75. This output supply voltage also is across resistances 291 and 292, and it is the voltage across capacitance 290 and parallel resistances 293 and 294 less the voltage drop in tube 284. Thus, an increase in negative bias on the grid of tube 283 will increase the tube's effective resistance and voltage drop and will lower the supply voltage on conductor 263.

The action of the automatic gain control circuit (135 in FIGURE 7, including amplifier 136) is as follows. If the level of light in the scanning zone increases, the negative going level of the video signal with respect to the D.C. reference level set by the tube 270 would increase. This would cause more conduction through the peak detector tube 275 increasing the negative voltage across resistance 280 and capacitance 281. This increase in negative voltage is amplified by the D.C. amplifier comprising tubes 282A and B, and results in a negative going change of bias on the grid of control tube 284 which lowers the voltage on conductor 263. This decreases the gain of the photomultiplier tube 75 and functions to provide a substantially constant output signal level at terminal FA. It will be recalled that the zero or reference level of the video signal is also controlled and this will be described subsequently in connection with FIGURE 15.

Figure 14:
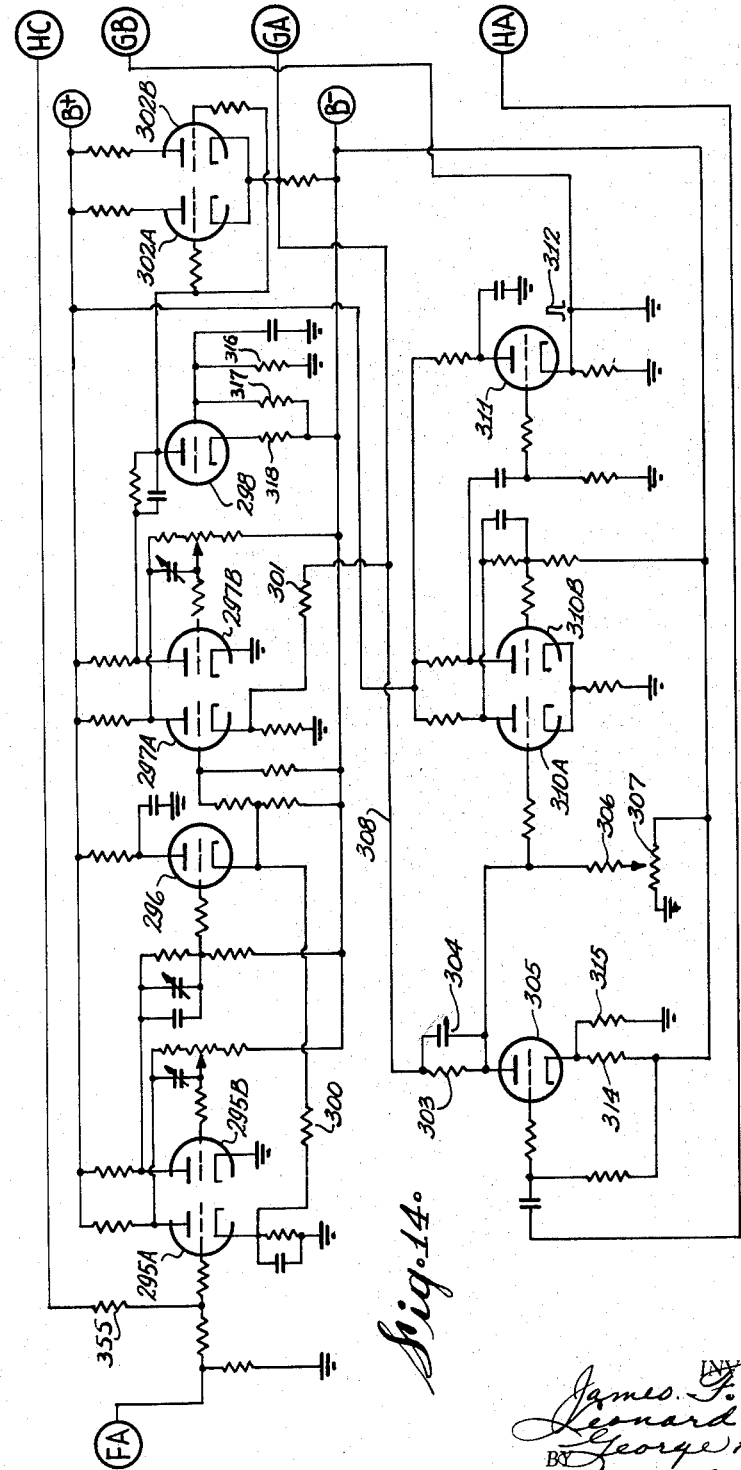

Referring now to FIGURE 14, the video signal at terminal FA is amplified in a D.C. amplifier (this is part of the D.C. amplifier 123 of FIGURE 7) which comprises tubes 295A, 295B, 296, 297A, 297B and 298. This D.C. amplifier includes two feedback loops. The first loop is formed by a resistance 300 connected between the cathodes of tubes 295A and 296. The second loop is formed by a resistance 301 connected between the cathode of tube 297A and the cathodes of a double cathode follower stage comprising tubes 302A and 302B. With perhaps the exception of the stage including 298, the D.C. amplifier is of conventional design.

The stage including tube 298 functions as a unique type of divider circuit whereby the D.C. voltage at the output of tube 297B is adjusted or divided downwards to a suitable voltage for the double cathode follower stage but the signal voltage is not divided but maintains its full amplitude. It will be apparent that if a divider network of resistances was used to adjust the D.C. voltage from tube 297B downwards for the double cathode follower, the signal swing or signal amplitude would also be reduced. The stage including tube 298 overcomes this disadvantage. Resistances 316 and 317 are series connected between a source of negative voltage B— and ground. The junction of these resistances is connected to the grid of tube 298 to supply a substantially constant bias voltage. The voltages are such that tube 298 is always conducting. Tube 298 will try to maintain a constant voltage drop across cathode resistance 318 and will carry a substantially constant current regardless of changes in voltage on its plate. As a result, the signal voltage is passed to the next stage, i.e. the grid of tube 302A without change, but the D.C. voltage at the plate of tube 298 has been divided downwards.

The video signal from the D.C. amplifier is thus applied to the double cathode follower stage which is used to provide a low output impedance for purposes of matching.

The cathode follower output is applied to a terminal designated GA and also over conductor 308 and a combination of resistance 303 and capacitance 304 to the plate of a gate tube 305 and then to an amplitude discriminator (124 of FIGURE 7). The amplitude discrimination function is performed by the resistance 303, resistance 306 and potentiometer 307. The potentiometer 307 is connected between the negative supply B— and ground to provide a variable negative voltage at the tap or arm of the potentiometer. This negative voltage sets the level 126 of waveform W5 of FIGURE 8, that is it sets the bias on the grid of tube 310A so that it does not conduct until a pulse (such as pulse 125 of W5 in FIGURE 8) caused by the obstructing of light by a salt body or crystal exceeds the bias level.

The tubes 310A and 310B are connected as a squarer circuit very similar to the squarer circuit comprising tubes 162A and 162B of FIGURE 10, and the operation is also the same. Tube 310A is normally cut off and tube 310B is normally conducting. When a pulse on the grid of tube 310A exceeds the reference, the conduction is transferred from tube 310B to 310A. When the grid of tube 310A falls below the reference, the conduction changes to its normal state. Thus, each pulse of the video signal exceeding the reference will cause a positive going voltage pulse at the plate of tube 310B which is applied to a cathode follower tube 311 and which results in a pulse 312 from the cathode follower at terminal GB. The terminal GB is connected by terminals GB, HB of FIGURE 15 to HB of FIGURE 11 where it connects to the third grids of the gating stages. The operation of these gating stages has been described.

Still referring to FIGURE 14, the gate tube 305 has its plate connected to the junction point of resistances 303 and 306 and its cathode connected to the junction point of resistances 314 and 315 which are series connected from the negative supply B— to ground. The plate and cathode of tube 305 are thus both negative with respect to ground, and the voltages are selected so that the tube 305 conducts when the positive going portion of a waveform W4 (FIGURE 8) is applied to its grid but does not conduct during the negative going portion. The waveform W4 is available at terminal HA as will be described shortly. When tube 305 is conducting there can be no signal from conductor 308 at the grid of tube 310A, and consequently there is no output from the squarer circuit of tubes 310A and 310B. This prevents any signal from appearing at the terminal GB between the actual scanning sweeps across the sorting zone. The gating of the amplitude discriminator may be omitted if desired because the ten gate stages (121 of FIGURE 7) will normally not pass signals from the amplitude discriminator that occur outside the sweep of the sorting zone. The gating of the amplitude discriminator acts as a supporting gate to ensure that spurious signals in the no signal time do not pass.

Referring to FIGURE 15, the two SSM stages (133 and 138 of FIGURE 7) are shown along with the zero control (137 of FIGURE 7). The two SSM stages receive their triggering signal from terminal EH and thence from terminal DA of FIGURE 10. The triggering signal is obtained from the squarer circuit of FIGURE 10 comprising tubes 176A and 176B which are actuated by the reset pulse. The first SSM comprises tubes 320A and 320B (SSM133 of FIGURE 7) and the second comprises tubes 321A and 321B (138 of FIGURE 7).

Considering the first SSM, tube 320A is normally conducting and tube 320B cut off. The rectangular pulse at terminal EH is differentiated and a diode 322, poled to conduct on the negative going spike shaped pulse, passes the negative pulse to the grid of tube 320A. This initiates the switch over of the SSM and conduction is transferred to tube 320B. The SSM circuit values and voltages are chosen so that the tube 320B remains conducting for a time lasting substantially until the first trigger pulse. Consequently, the output waveform taken from the plate of tube 320A and passed by conductor 323 to terminal HA, is substantially of the shape of W4 of FIGURE 8. As was previously described, this waveform is used to gate the amplitude discriminator circuit of FIGURE 14.

Similarly, in the second SSM, the tube 321A is normally conducting and tube 321B is cut off. The negative going spike shaped part of the signal from terminal EH is applied to the grid of tube 321A to initiate switching of the SSM. The switched time of this second SSM is designed to be of short duration. Thus, immediately following the reset pulse the SSM switches over and back providing on the plate of tube 321A and conductor 325 a positive going voltage and then a negative going return. This signal is differentiated by capacitor 326 and thus a positive and then a negative pulse are applied to the grid of tube 327A. The tube 327A is normally conducting and the positive going pulse has no effect. However, the negative going pulse cuts off the plate current in tube 327A and it remains cut off for a short period primarily determined by resistances 330 and 331 and capacitance 326. While the tube 327A is cut off there is no current flow through resistance 332 in its cathode circuit and no voltage drop across it. Tube 327B is biased so that the voltage drop across resistance 322 is sufficient to cut it off. Therefore tube 327B is permitted to conduct during the time tube 327A is cut off. The tube 327B is, in effect, gated on in this manner for a short period following the reset pulse while the light detector system is between scans and is receiving no light. The gate voltage may be of the shape of waveform W7 of FIGURE 8.

The tube 327B acts as the cathode load resistance for a long tail pair stage (141 of FIGURE 7) which includes tubes 333A and 333B. The video signal, or scanned light signal is at terminal GA and is applied to the grid of tube 333A. It will be recalled that it is desirable to establish a zero or base reference for this video signal. The grid of tube 333B is at a fixed potential dictated by the resistances 334 and 335 series connected between the positive voltage source B+ and ground. When tube 327B is gated on either tube 333A or 333B will also conduct.

Suppose that during the time tube 327B is gated on, the grid of tube 333A is positive with respect to a reference, that is, the signal at terminal GA is positive, then current will flow through tube 333A and produce a positive potential on the cathode of tube 333B cutting it off. On the other hand, if the voltage on the grid of tube 333A is negative with respect to the same reference no current will flow through tube 333A, but current will flow through tube 333B. Under the condition where equal voltages are on the grids of tubes 333A and 333B when they are permitted to conduct, both the tubes may conduct.

It will be seen that when tube 333A conducts, a negative pulse appears across load resistance 336, and if tube 333B conducts a negative pulse appears across load resistance 337. The output from tube 333A is coupled by a capacitor 338 to the plate of a diode tube 340B and also to the cathode side of a crystal diode 341. The output from tube 333B is coupled by a capacitor 342 to the cathode of a diode tube 340A and also to the anode side of a crystal diode 343. When tube 333B produces a negative going pulse, the tube 340A conducts producing a current through load resistance 344 charging capacitor 345. At the same time the capacitor 342 assumes a difference potential because of the current through tube 340A. At the end of the pulse, the plate of tube 333B again assumes the potential of the supply voltage and capacitor 342 is restored to its normal state by current flowing through the restoration diode 343. A similar action takes place when a negative output pulse is produced by tube 333A. The diode tube 340B and diode 341 are in this case connected in opposite directions. The negative pulse causes a current flow through diode 341, and after the pulse the charge on capacitor 338 is restored to normal by current through diode tube 340B. This causes a current through resistance 346 charging capacitor 347.

If the tube 333B is conducting and producing output pulses, capacitor 345 will be charged negatively and capacitor 347 will not be charged. If tube 333A is conducting and producing output pulses, the capacitor 347 will be charged positively. A voltage divider network comprising resistances 350 and 351 is connected across the two capacitors 345 and 347. The junction of these two resistances therefore provides a negative output when tube 333B conducts and a positive output when tube 333A conducts. If both tubes should conduct there would be no output at the junction of resistances 350 and 351. This output has an integrating capacitance 352 connected to it. The output is amplified by a conventional D.C. amplifier tube 353 and the amplified output is available via conductor 354 at terminal HC. This is the zero or baseline control voltage and it is applied to the grid electrode of tube 295A in FIGURE 14.

The action of this zero or baseline control circuit is described as follows. After a scan across the sorting zone is completed, light is cut off from the photomultiplier tube for a short period of time. While the light is prevented from reaching the photomultiplier, the zero control or reference control is gated on. During this time the output from the D.C. amplifier, which is at terminal GA, should fall to its reference baseline (which may be zero or ground potential). If it is not at its reference level but is, for instance, positive with respect to the reference, tube 333A will conduct. This will produce a positive signal on the grid of tube 353 as just explained. This increases the plate current through tube 353 and changes the plate voltage in a negative direction. The negative going voltage is applied over conductor 354, terminal HC, and resistance 355 to the grid of tube 295A. Tube 295A is the first tube in the D.C. amplifier shown in FIGURE 14, and the negative going voltage decreases the output of the D.C. amplifier and adjusts the voltage at terminal GA in a negative direction. The inverse action takes place if the output at terminal GA is negative with respect to the reference during the particular gated part of the no signal period. It should be noted that due to the action of the integrating capacitor 352, a large number of pulses from either tube 333A or 333B is required to adjust the D.C. amplifier by an appreciable amount. The use of a short time constant would tend to cause the control voltage at HC to fluctuate between pulses.

It is believed that the entire operation of the apparatus and circuitry should now be clear.

It is also believed that the embodiments of the invention described herein, along with the examples of the apparatus and circuitry that can be used in putting the invention into practice are typical. It will be obvious to those skilled in the art that various modifications and variations can be made without departing from the true invention which is defined in the appended claims.

We claim:

1. Apparatus for sorting irregularly shaped bodies of material each having an individual value of a remotely detectable physical property, comprising (a) a hopper arranged to receive a mass of said bodies and having a bottom outlet for said bodies, (b) means defining a sorting zone located below said hopper and having a generally vertical unobstructed path therethrough, (c) a feed device having a smooth unobstructed body receiving and conducting surface, said surface having a portion spaced from and directly underlying the entire area of said outlet to receive said bodies in random fall from said outlet, said surface extending laterally beyond said portion and having an unobstructed discharge edge located substantially directly above said path for random discharge of said bodies into said path, (d) said path and said feed device surface constituting an unobstructed wide passage for a random stream of said bodies, (e) detector means positioned laterally of and scanning the entire width of said passage to provide a signal indicative of the value of said physical property of each said body in said passage related to the position and extent of the transversely extending portion of said passage over which said body moves, (f) a row of rejection devices positioned laterally of said path and lying opposite the entire width of said path, said rejection devices abutting one another to provide a substantially continuous rejection means from one end to the other of said row, (g) each said rejection device being normally inoperative to permit unrestricted passage of said bodies therepast and having an operative body-directing condition, and (h) means responsive to one of said signals of a predetermined value related to the transversely extending portion of said path over which each said body moves, actuating to said operative condition the number of said rejection devices lying opposite said transversely extending portion of said path.

2. Apparatus for sorting bodies of material moving through a sorting zone, each body having an individual value of a remotely detectable physical property comprising (a) a feed hopper arranged to receive a mass of said bodies and having a bottom gravitationally fed outlet for said bodies, (b) a feed table having a smooth unobstructed body receiving and conducting surface with a portion directly underlying the entire area of said outlet and spaced therefrom for reception of bodies passing at random positions through said outlet, (c) the surface of said feed table being inclined downwardly from and laterally beyond said portion underlying said outlet for gravitationally influenced movement of said bodies along said surface, (d) said surface having a terminating end for discharging therefrom bodies moving down said surface in a wide random stream, (e) means defining said sorting zone disposed beneath said terminating end and having an unobstructed wide path for passage therethrough under the influence of gravity of a random stream of said bodies discharged from said terminating end, (f) detector means positioned laterally of and scanning the entire width of said path to provide a signal indicative of the value of said physical property of each said body in said path related to the position and extent of the transversely extending portion of said path over which said body moves, (g) a row of rejection devices positioned laterally of said path and lying opposite the entire width of said path, said rejection devices abutting one another to provide a substantially continuous rejection means from one end to the other of said row, (h) each said rejection device being normally inoperative to permit unrestricted passage of said bodies therepast and having an operative body-directing condition, and (i) means responsive to one of said signals of a predetermined value related to the transversely extending portion of said path over which each said body moves, actuating to said operative condition the number of said rejection devices lying opposite said transversely extending portion of said path.

3. Apparatus for sorting bodies of material each having a value of translucency, comprising (a) a feed hopper arranged to receive a mass of said bodies and having a bottom gravitationally fed outlet for said bodies, (b) a feed table having a smooth unobstructed body receiving and conducting surface with a portion directly underlying the entire area of said outlet and spaced therefrom for reception of bodies passing at random positions through said outlet, (c) the surface of said feed table being inclined downwardly from and laterally beyond said portion underlying said outlet for gravitationally influenced movement of said bodies along said surface, (d) said surface having a terminating end for discharging therefrom bodies moving down said surface in a wide random stream, (e) means defining a sorting zone disposed beneath said terminating end and including a translucent light dispersing plate having a smooth unobstructed surface facing said sorting zone, (f) said surface of said translucent plate being inclined to the vertical and positioned below said terminating end to receive therefrom a wide path random stream of bodies on said surface of said plate for guiding said bodies down said surface in engagement therewith and discharging said bodies from a lower end thereof in free fall, (g) a light source adjacent said translucent plate on the side thereof remote from said sorting zone directing a transversely disposed beam of dispersed light through said plate into said sorting zone, (h) a photometric light detector adjacent said sorting zone opposite said light source to receive light therefrom, (i) scanning means associated with said photometric detector and scanning said sorting zone, (j) said detector providing a signal indicative of the translucency of each scanned body related to the transverse position of each said body in said stream, (k) a row of fluid nozzles each having a control for fluid flow therethrough mounted in abutting side by side relationship adjacent said sorting zone and extending transversely across the width thereof to provide a substantially continuous rejection means from one end to the other of said row, (l) said nozzles being positioned below the lower end of said translucent plate, (m) separating means dividing said signal into a number of portions corresponding to the predetermined number of fluid nozzles, (n) successive portions of said signal representing the translucency of bodies in successive contiguous portions of said stream, (o) a discriminator means receiving said portions of said signals and being responsive to a predetermined relationship between each said portion and a reference to provide an output signal for each said portion, and (p) means connecting said discriminator means to each said control for fluid flow to apply a respective output signal thereto initiating a fluid blast through the respective number of said nozzles to alter the course of the signal-originating body passing said respective number of said nozzles.

4. In a system for sorting irregular bodies of material, the apparatus comprising (a) a feed hopper arranged to receive a mass of said bodies and having a bottom gravitationally fed outlet for said bodies, (b) a feed table having an upper section and a lower section each with a smooth unobstructed body conducting surface, (c) said sections being secured together with the end of one section adjacent and spaced from the other section to form a transverse dust passing slot therebetween, and said sections making a large obtuse angle with one another forming a small crest in the table surface at adjacent ends of said sections, (d) the surface of said table being inclined to the vertical with said slot extending transversely to the direction of slope and said upper section having a lesser slope than that of said lower section, (e) said feed table being positioned with a transverse portion of said upper section underlying the entire area of said outlet and spaced therefrom for reception of bodies of material from said outlet across the width of said table, (f) vibrating means connected to said table to cause movement of said bodies downwards of the surface of said table in a random stream extending the width of said table, (g) said lower section of said table having a terminating end for discharge of bodies moving down its surface in a wide path random stream, (h) means defining a sorting zone disposed beneath said terminating end and having an unobstructed wide path for passage therethrough under the influence of gravity of a random stream of said bodies discharged from said terminating end, (i) scanning means positioned adjacent said sorting zone for scanning transversely across the width of said stream, (j) light detector means associated with said scanning means to provide a signal indicative of a light affecting property of each body scanned, (k) a row of rejection devices positioned below said light detector means and lying opposite the entire width of said path, said rejection devices abutting one another to provide a substantially continuous rejection means from one end to the other of said row, (l) each said rejection device being normally inoperative to permit unrestricted passage of said bodies therepast and having an operative body-directing condition, and (m) means responsive to one of said signals of a predetermined value related to the transversely extending portion of said path over which each said body moves, actuating to said operative condition the number of said rejection devices lying opposite said transversely extending portion of said path.

References Cited by the Examiner
UNITED STATES PATENTS

| | | | |
|---|---|---|---|
| 2,332,600 | 10/43 | Rapp. | |
| 2,342,116 | 2/44 | Broekhuysen. | |
| 2,726,762 | 12/55 | Aubry | 209—111.5 |
| 3,011,634 | 12/61 | Hutter | 209—111.5 X |
| 3,028,960 | 4/62 | Currie | 209—111.5 X |
| 3,056,033 | 9/62 | Shepard | 209—111.5 X |

SAMUEL F. COLEMAN, Acting Primary Examiner.

ROBERT B. REEVES, Examiner.